United States Patent
Wang et al.

(10) Patent No.: US 11,296,736 B2
(45) Date of Patent: Apr. 5, 2022

(54) TIME-SHARING DETECTION CONTROL CIRCUIT, WIRELESS TRANSCEIVER SYSTEM AND TIME-SHARING DETECTION AND CONTROL METHOD

(71) Applicant: SHENZHEN HUAPTEC CO., LTD., Shenzhen (CN)

(72) Inventors: Yanwei Wang, Shenzhen (CN); Songlin Zhou, Shenzhen (CN); Ziping Zhao, Shenzhen (CN)

(73) Assignee: SHENZHEN HUAPTEC CO., LTD., Shenzhen (CN)

( * ) Notice: Subject to any disclaimer, the term of this patent is extended or adjusted under 35 U.S.C. 154(b) by 0 days.

(21) Appl. No.: 17/078,081

(22) Filed: Oct. 22, 2020

(65) Prior Publication Data
US 2021/0135697 A1    May 6, 2021

Related U.S. Application Data

(63) Continuation-in-part of application No. PCT/CN2019/115065, filed on Nov. 1, 2019.

(51) Int. Cl.
*H04B 1/04* (2006.01)
*H04B 1/00* (2006.01)

(52) U.S. Cl.
CPC ......... *H04B 1/0483* (2013.01); *H04B 1/0078* (2013.01); *H04B 1/0475* (2013.01); *H04B 2001/0408* (2013.01)

(58) Field of Classification Search
CPC ................ H04B 2001/0408; H04B 1/04; H04B 1/0475; H04B 1/0483; H04B 1/0078

USPC ................. 375/219, 262, 295–297
See application file for complete search history.

(56) References Cited

U.S. PATENT DOCUMENTS

| | | | | |
|---|---|---|---|---|
| 5,802,173 | A * | 9/1998 | Hamilton-Piercy | .................... H04W 88/085 379/56.2 |
| 6,397,077 | B1 * | 5/2002 | Jensen | ............. H03G 3/3042 455/551 |
| 10,498,371 | B1 * | 12/2019 | Parikh | ................ H04B 1/006 |
| 10,541,749 | B2 * | 1/2020 | Ishii | ............ H04B 10/07957 |

(Continued)

FOREIGN PATENT DOCUMENTS

| CN | 201663698 U | 12/2010 |
|---|---|---|
| CN | 204790442 U | 11/2015 |

(Continued)

OTHER PUBLICATIONS

International Search Report for PCT/CN2019/115065.

*Primary Examiner* — Emmanuel Bayard (57) ABSTRACT

A time-sharing detection control circuit connected to a plurality of amplification links, includes: a control module to sequentially output a number of switching control signals at preset intervals; a detection module electrically connected to the control module, and a change-over switch. The detection module converts output signals from the amplification links into detection signals and output the detection signals to the control module. The change-over switch is connected to the control module, the detection module and each of the amplification links, and sequentially selects one of the amplification links to be connected to the detection module at preset intervals under control of the switching control signals so as to enable the output signals from the one of the amplification links to be inputted into the detection module.

12 Claims, 8 Drawing Sheets

(56) References Cited

U.S. PATENT DOCUMENTS

| | | | | |
|---|---|---|---|---|
| 2007/0165744 A1* | 7/2007 | Ishida | ............... | H03G 3/3047 |
| | | | | 375/296 |
| 2007/0291668 A1* | 12/2007 | Duan | ............... | H04B 7/2606 |
| | | | | 370/280 |
| 2008/0076437 A1* | 3/2008 | Wilson | ............... | H04B 7/15535 |
| | | | | 455/450 |
| 2011/0207421 A1 | 8/2011 | Chan | | |
| 2012/0229192 A1* | 9/2012 | Katoh | ............... | H03K 17/063 |
| | | | | 327/427 |
| 2013/0100999 A1* | 4/2013 | Furuta | ............... | H04B 1/40 |
| | | | | 375/219 |
| 2015/0133103 A1* | 5/2015 | Lee | ............... | G06F 1/206 |
| | | | | 455/418 |
| 2015/0338495 A1* | 11/2015 | Akizuki | ............... | H03G 3/3036 |
| | | | | 307/104 |
| 2019/0310379 A1* | 10/2019 | Akos | ............... | G01S 19/36 |
| 2019/0312641 A1* | 10/2019 | Ishii | ............... | H04B 10/2942 |
| 2020/0021244 A1* | 1/2020 | Marques | ............... | H03L 3/00 |

FOREIGN PATENT DOCUMENTS

| | | |
|---|---|---|
| CN | 206759401 U | 12/2017 |
| JP | 2008283426 A | 11/2008 |

\* cited by examiner

TIME-SHARING DETECTION CONTROL CIRCUIT, WIRELESS TRANSCEIVER SYSTEM AND TIME-SHARING DETECTION AND CONTROL METHOD

CROSS REFERENCE TO RELATED APPLICATIONS

The present application is a continuation-in-part of International Application PCT/CN2019/115065, with an international filing date of Nov. 1, 2019, the contents of all of which are hereby incorporated by reference.

BACKGROUND

1. Technical Field

The present disclosure generally relates to wireless transceivers, and particularly to a time-sharing detection control circuit, a wireless transceiver system, and a time-sharing detection and control method.

2. Description of Related Art

Conventional wireless transceiver systems generally include multiple amplification links, and each link generally needs an independent detection circuit to detect the amplification links, which requires a large number of detection circuits. This often leads to increase in the complexity of overall circuit and a bulky printed circuit board (PCB).

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

The terms "upper", "lower", "left" and "right", indicating the orientational or positional relationship based on the orientational or positional relationship shown in the drawings, are merely for convenience of description, but are not intended to indicate or imply that the device or elements must have a particular orientation or be constructed and operated in a particular orientation, and therefore should not be construed as limiting the present invention. The terms "first" and "second" are used for descriptive purposes only and are not to be construed as indicating or implying relative importance or implicitly indicating the number of technical features. The meaning of "multiple" is two or more, unless expressly stated otherwise.

Figure 1A:
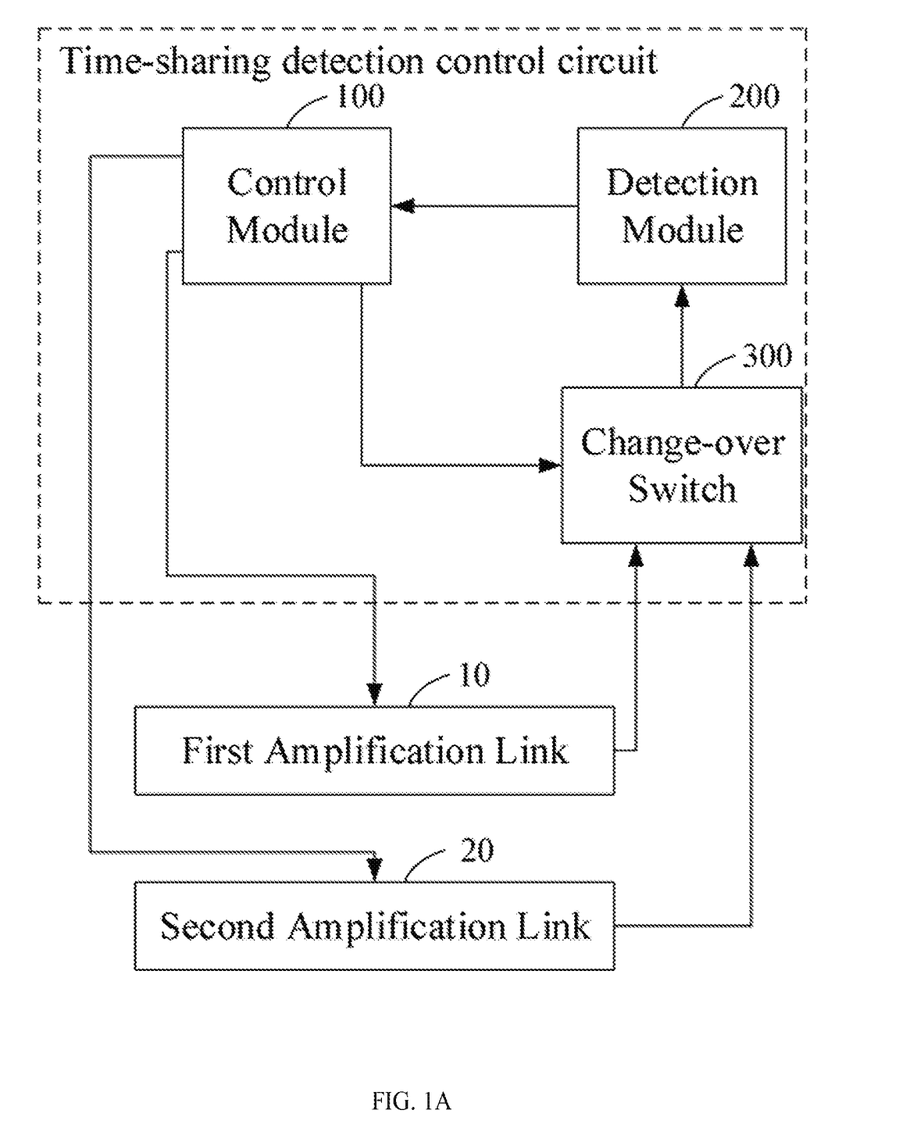
FIG. 1A is a schematic block diagram of a time-sharing detection control circuit according to one embodiment.

Referring to FIG. 1A, in one embodiment, a time-sharing detection control circuit is electrically connected to a first amplification link 10 and a second amplification link 20. It should be noted that, in other embodiments, the time-sharing detection control circuit may be connected to three or more amplification links.

The time-sharing detection control circuit includes a control module 100, a detection module 200, and a change-over switch 300. A control terminal of the change-over switch 300 is connected to the control module 100, a common terminal of the change-over switch 300 is connected to an input terminal of the detection module 200, and the branch terminals of the change-over switch 300 are connected to output terminals of amplification links. That is, the first branch terminal of the change-over switch 300 is connected to the output terminal of the first amplification link 10, and the second branch terminal of the change-over switch 300 is connected to the output terminal of the second amplification link 20. The signal adjusting terminals of the amplification links are connected to the control module 100. That is, the signal adjusting terminal of the first amplification link 10 is connected to the control module 100, and the signal adjusting terminal of the second amplification link 20 is connected to the control module 100. The control module 100 is configured to sequentially output a plurality of switching control signals at preset intervals. The detection module 200 is configured to convert output signals from the amplification links into detection signals and output the detection signals to the control module 100. The change-over switch 300 is configured to sequentially select one of the amplification links to be connected to the detection module 200 at preset intervals under control of the switching control signals so as to enable the output signal from the one of the amplification links to be inputted into the detection module 200. That is, the connection path between the detection module 200 and the first amplification link 10 or the second amplification link 20 is sequentially gated according to the preset interval, so that the output signals of the first amplification link 10 or the second amplification link 10 can be fed into the detection module 200.

The control module 100 can be a microprocessor. The detection module 200 can be a device with a detection function, such as a detection transistor. The change-over switch 300 can be a switching device having multiple branch terminals and at least one common terminal, such as a multiplexer, a multi-channel analog switch or a multi-channel radio frequency switch.

The value of the preset interval can be set according to the actual conditions of the system where the multiple amplification links are used. In the embodiment, the change-over switch 300 outputs the output signals of each amplification link to the detection module 200 in a time-sharing manner. The detection module 200 converts each output signal into a detection signal in a time-sharing manner, and then outputs it to the control module 100 for processing, which can realize the time-sharing detection and control of multiple amplification links.

With such configuration, the time-sharing detection and control of multiple amplification links can be realized based on the detection module 200 and the control module 100, which can avoid the shortcomings of increased complexity of overall circuit and bulky PCB, caused by that each amplification link of conventional wireless transceivers requires an independent detection circuit.

Figure 1B:
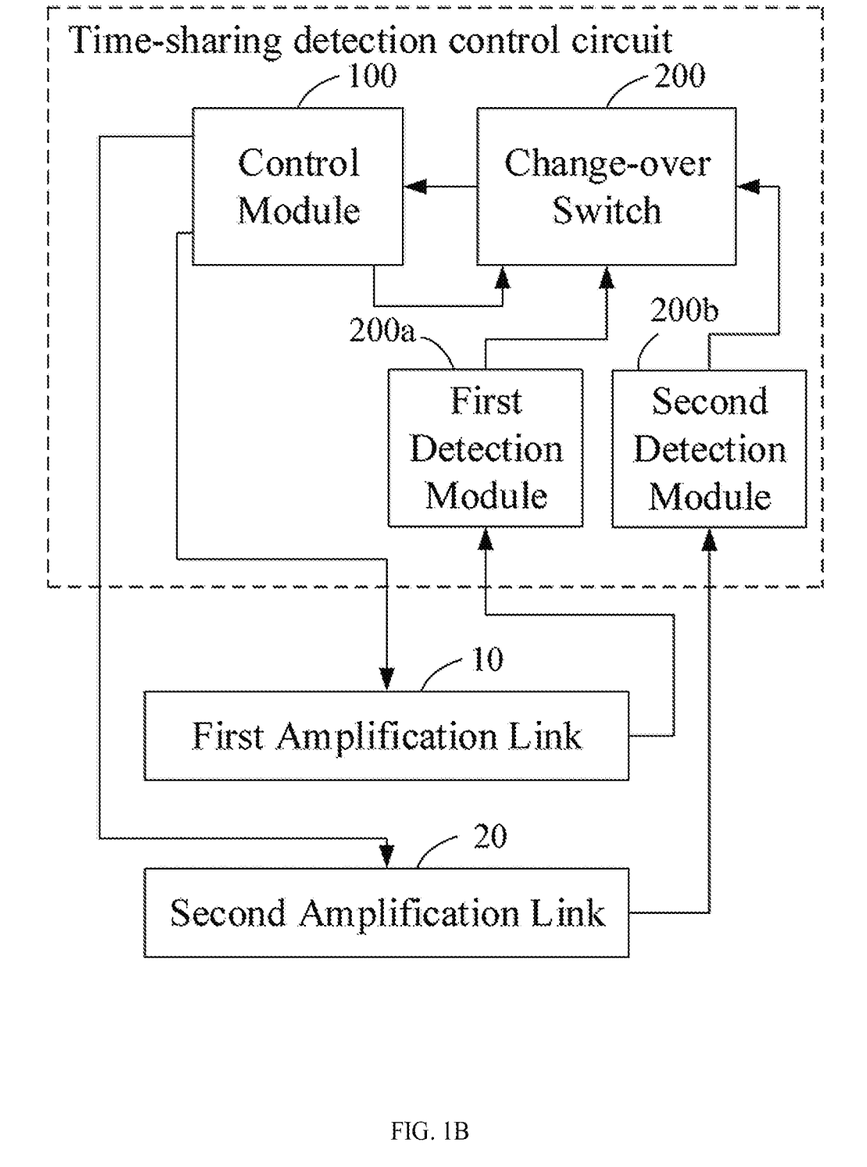
FIG. 1B is a schematic block diagram of a time-sharing detection control circuit according to an alternative embodiment.

Referring to FIG. 1B, in an alternative embodiment, a time-sharing detection control circuit may include a plurality of detection modules. In the embodiment, the number of the detection modules equal to the number of the amplification links. That is, there are two detection modules (hereinafter "first detection module 200a" and "second detection module 200b"). The first detection module 200a is electrically connected to the first amplification link 10, and the second detection module 200b is electrically connected to second amplification link 20. In the embodiment, the change-over switch 300 is electrically connected to the control module 100 and the detection modules 200a and 200b. The change-over switch 300 is configured to sequentially select one of the first detection module 200a and the second detection module 200b to be connected to the change-over switch 300 at preset intervals under control of the switching control signals so as to enable the output signal from the one of the amplification links to be inputted into the detection module 200. In the embodiment, the change-over switch 300 is controlled by the control module 100 through electrical signals.

With the configuration as shown in FIG. 1B, the time-sharing detection and control of multiple amplification links can be realized based on the control module 100, which can avoid the shortcomings of increased complexity of overall circuit and bulky PCB, caused by that each amplification link of conventional wireless transceivers requires an independent control circuit.

In one embodiment, the control module 100 is connected to the signal adjusting terminals of the amplification links. The control module 100 is configured to compare the detection signals with standard signals after receiving the detection signals, and output operating parameters for adjusting the amplification links according to a comparison result.

It should be noted that the signal parameters of the detection signals can be compared with the corresponding signal parameters of the standard signals one by one. The signal parameters include but are not limited to signal strength, signal size, signal distortion, etc. The control method of the control signals on the amplification links can be automatic level control (ALC) or automatic gain control (AGC). The operating parameters of the amplification links include amplification parameters, attenuation parameters, etc. That is, by adjusting the operating parameters such as the amplification parameters or attenuation parameters of the amplification links, the signal parameters of the input signals input to the amplification links are processed into the output signals by the amplification links, and the signal parameters of the output signals are consistent with the signal parameters corresponding to the standard signals.

In one embodiment, each signal parameter of the detection signals may be compared with a preset parameter threshold, and then the control signals are generated according to the comparison results.

In one embodiment, each signal parameter of the detection signals can be differentiated from a preset parameter threshold, and the differences can be compared with a standard deviation range pre-stored in the control module 100. The control signals may be generated according to the positions where the difference falls within the pre-stored standard deviation range.

In the embodiment, the time-sharing detection control circuit generates a control signal according to the result of comparison of the detection signals with the standard signals, and uses the control signal to adjust the signal parameters of the output signal of the corresponding amplification link, thereby realizing real-time adjustment and control of the output signal of the amplification link, and avoiding distortion of the output signals of the amplification link due to external signal interference or damage to internal components. In addition, when the input signals of the amplification links are different, its output signals remain standard signals, which avoids the problem that the output signals change too much when the input signals change too much in conventional wireless transceiver systems, which is caused by that the operating parameters of the amplification links are fixed values.

In one embodiment, when a signal strength of the detection signals is greater than a signal strength of the standard signals, the control signal is configured to control one of the amplification links to increase a current attenuation. When the signal strength of the detection signals is less than the signal strength of the standard signals, the control signal is configured to control the one of the amplification links to reduce the current attenuation. When the signal strength of the detection signals is greater than the signal strength of the standard signals, the control signal is configured to control the amplification link to maintain the current attenuation. It should be noted that when other signal parameters need to be adjusted, the comparison manner and adjustment manner can refer to the present embodiment.

It should be noted that after the control signals control the amplification links to increase or decrease the current attenuation, the attenuation value parameter is increased or decreased to a new attenuation value parameter. After that, the control signals control the amplification links to maintain the new attenuation value parameter until the next cycle when a new detection is performed on the amplification links and new control signals are generated according to the detection signals.

In the embodiment, the time-sharing detection circuit compares the signal strength of the detection signals with the standard signals, and adjusts the attenuation parameters of the amplification links in real time according to the comparison result, thereby realizing the adjustment of the signal intensity of the output signals of the amplification links.

In one embodiment, when the detection module 200 is not connected to the amplification links, the control module 100 continuously outputs one of the plurality of switching control signals in a previous interval to the amplification links.

It should be noted that the control module 100 has been continuously outputting control signals to the corresponding amplification links. When the change-over switch 300 connects one amplification link to the detection module 200, the output signals of the amplification link are output to the input terminal of the detection module 200 through the change-over switch 300. The detection module 200 converts the output signals of the amplification link into detection signals and sends the detection signals to the control module 100. The control module 100 generates new control signals according to the detection signals and outputs the new control signals to the amplification link, thereby refreshing the real-time control of the amplification link. At the same time, during this period, for the rest of the amplification links that are not connected to the detection module 200, the control module 100 continuously outputs the control signals of the previous cycle to the corresponding amplification links. That is, during this period, the control module 100 maintains the original control for the undetected amplification links.

In the embodiment, when the amplification links are not connected to the detection module 200, the control module 100 continues to output the control signals in the previous interval to these amplification links so as to maintain the control of the amplification links, which guarantees the full-time control and the time-sharing detection and refresh control of the amplification links.

In one embodiment, the detection module 200 may be a detection diode or a detection chip. If the detection module 200 is a detection diode, the anode of the detection diode serves as the input terminal of the detection module 200, and the cathode of the detection diode serves as the output terminal of the detection module 200. If the detection module 200 is a detection chip, the detection input terminal of the detection chip serves as the input terminal of the detection module 200, and the detection output terminal of the detection chip serves as the output terminal of the detection module 200.

In the embodiment, the detection module 200 can use a detection diode to perform detection, which means a simple device can be used to complete the conversion of the output signals of the amplification links into detection signals, and prevents that other signals of the control module 100 are erroneously transmitted to the amplification links through the detection module 200.

In one embodiment, the change-over switch 300 may be a multi-channel analog switch or a multi-channel radio frequency switch.

If the change-over switch 300 is a multi-channel analog switch, the address terminal of the multi-channel analog switch serves as the control terminal of the change-over switch 300 and is connected to the control module 100, and the common terminal of the multi-channel analog switch serves as the common terminal of the change-over switch 300 and is connected to the detection module 200. The branch terminals of the multi-channel analog switch serve as the branch terminals of the change-over switch 300 and are connected to the output terminals of the amplification links. The multi-channel analog switch can determine the electrical level signal received by its address terminal and determine whether to close the connection between one branch terminal and the common terminal according to the electrical level signal. It should be noted that if the number of amplification links that need to be detected is two, the change-over switch 300 can use two-channel analog switches, and if the number of amplification links that need to be detected is four, the change-over switch 300 can use four-channel analog switches.

If the change-over switch 300 is a multi-channel radio frequency switch, the control terminal of the multi-channel radio frequency switch serves as the control terminal of the change-over switch 300 and is connected to the control module 100, and the radio frequency signal common terminal of the multi-channel radio switch serves as the common terminal of the change-over switch 300 and is connected to the input terminal of the detection module 200. The radio frequency signal branch terminals of the multi-channel radio frequency switch serve as the branch terminals of the change-over switch 300 and are connected to amplification links, respectively.

In the embodiment, the change-over switch 300 uses a multi-channel analog switch or a multi-channel radio frequency switch, so that in a certain period of time, only one connection path between one amplification link and the detection module 200 is turned on according to the switching control signals of the control module 100, which avoids the problem of signal confusion caused by turning on multiple connection paths between the amplification links and the detection module 200 in the same period of time.

Figure 2:
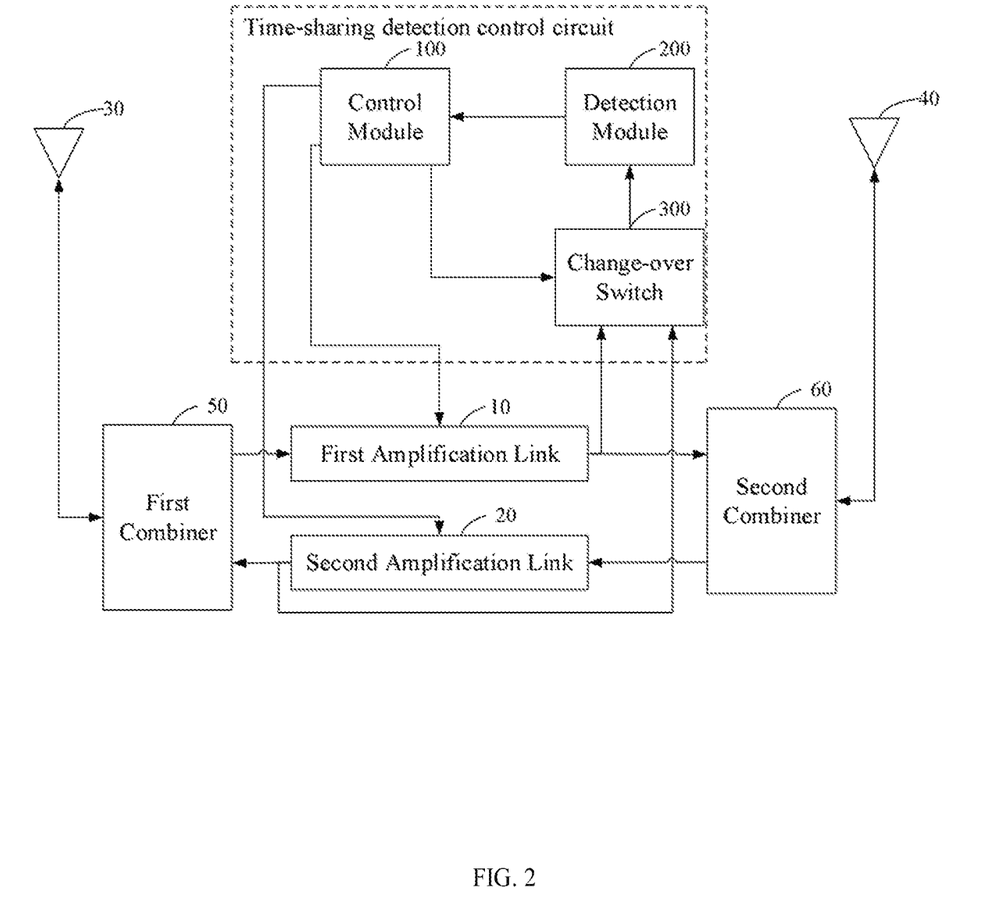
FIG. 2 is a schematic block diagram of a wireless transceiver system according to one embodiment.

Referring to FIG. 2, in one embodiment, a wireless transceiver system includes a first antenna 30, a second antenna 40, a first amplification link 10, a second amplification link 20, a first combiner 50, a second combiner 60, and the time-sharing detection control circuit as described above. The common port of the first combiner 50 is connected to the first antenna 30. The common port of the second combiner 60 is connected to the second antenna 40. The first branch terminal of the first combiner 50 is connected to the first amplification link 10. The second branch terminal of the first combiner 50 is connected to the output terminal of the second amplification link 20. The first branch terminal of the second combiner 60 is connected to the output terminal of the first amplification link 10. The second branch terminal of the second combiner 60 is connected to the input terminal of the second amplification link 20. The first antenna 30 and the second antenna 40 are configured to receive input signals and/or transmit output signals. The first amplification link 10 is configured to receive an input signal through the first antenna 30, amplify the input signal into an output signal, and output the output signal through the second antenna 40. The second amplification link 20 is configured to receive an input signal through the second antenna 40, amplify the input signal into an output signal, and output the output signal through the first antenna 30. The first combiner 50 is configured to turn on a signal transmission channel between the first antenna 30 and the first amplification link 10 or the second amplification link 20. The second combiner 60 is configured to turn on a signal transmission channel between the second antenna 40 and the first amplification link 10 or the second amplification link 20.

In other embodiments, there may be three or more antennas, amplification links and combiners. Each antenna is configured to receive an input signal and transmit an output signal. Each amplification link is configured to receive an input signal through one of the antennas, amplify the input signal into an output signal and output the output signal through another one of the antennas.

In the embodiment, by including the time-sharing detection control circuit, it can realize the time-sharing detection and control of multiple amplification links in the wireless transceiver system by using one detection module 200 and one control module 100, which can avoid the shortcomings of increased complexity of overall circuit and bulky PCB, caused by that each amplification link of conventional wireless transceivers requires an independent detection circuit.

Figure 3:
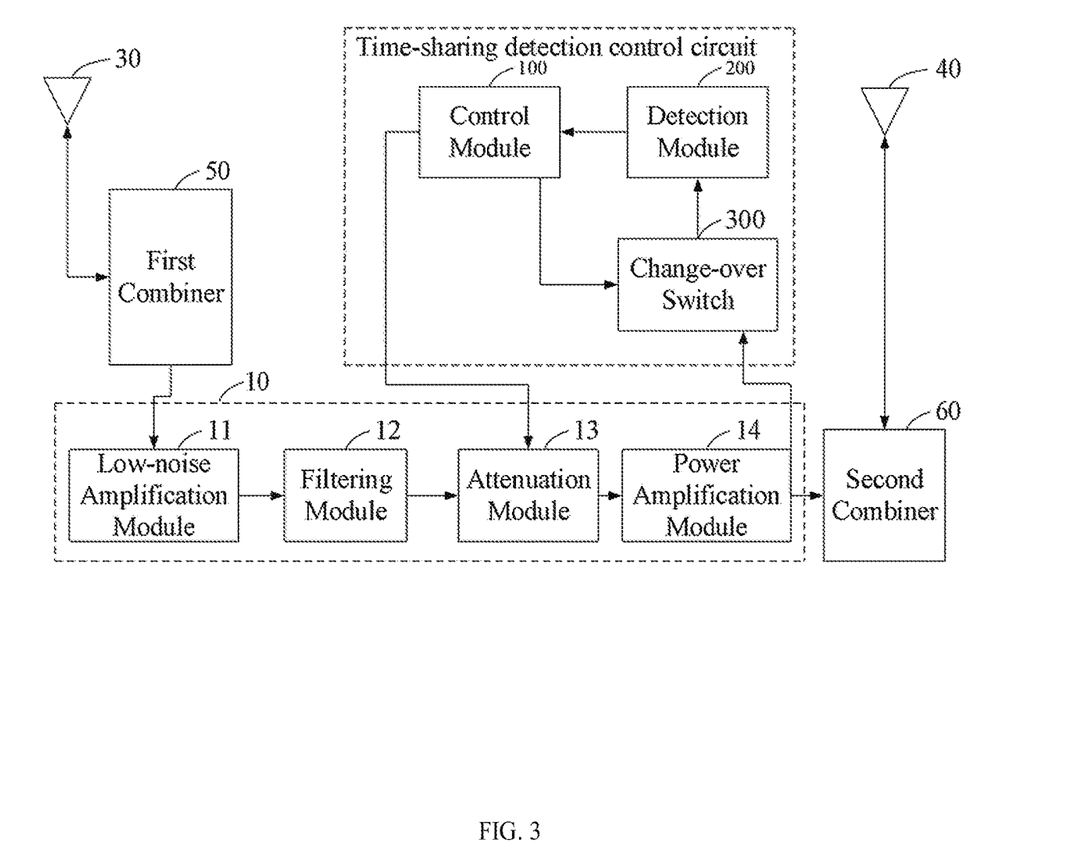
FIG. 3 is a schematic block diagram of a first amplification link of the wireless transceiver system of FIG. 2.

Referring to FIG. 3, in one embodiment, the first amplification link 10 includes a low-noise amplification module 11, a filtering module 12, an attenuation module 13, and a power amplification module 14. The input terminal of the low-noise amplification module 11 is connected to a branch port of the first combiner 50. The input terminal of the filtering module 12 is connected to the output terminal of the low-noise amplification module 11. The input terminal of the attenuation module 13 is connected to the output terminal of the filtering module 12. The control terminal of the attenuation module 13 serves as a signal adjusting terminal of the amplification links and is connected to the control module 100. The input terminal of the power amplification module 14 is connected to the output terminal of the attenuation module 13, and the output terminal of the power amplification module 14 is connected to the change-over switch 300 of the time-sharing control circuit and a branch port of the second combiner 60. The low-noise amplification module 11 is configured to receive input signals and amplify the input signals. The filtering module 12 is configured to filter out the clutter interference of the signals output by the low-noise amplification module 11. The attenuation module 13 is configured to adjust the signal strength of the signals output by the filtering module 12. The power amplification module 14 is configured to amplify the signals output by the attenuation module 13 and output the signal as an output signal through a branch port of the second combiner 60.

In one embodiment, the low-noise amplifier module 11 can be a low-noise amplifier U1. The filtering module 12 can be a filter such as a model 2140SA filter. The attenuation module 13 can be an attenuator. The power amplifier module 14 may be a power amplifier Q1.

In the embodiment, the amplification links realize the amplification, filtering and adjustment of the input signals by including the low-noise amplification module 11, the filtering module 12, the attenuation module 13, and the power amplification module 14, which enable the output signals of the amplification links to meet predefined requirements.

Figure 4:
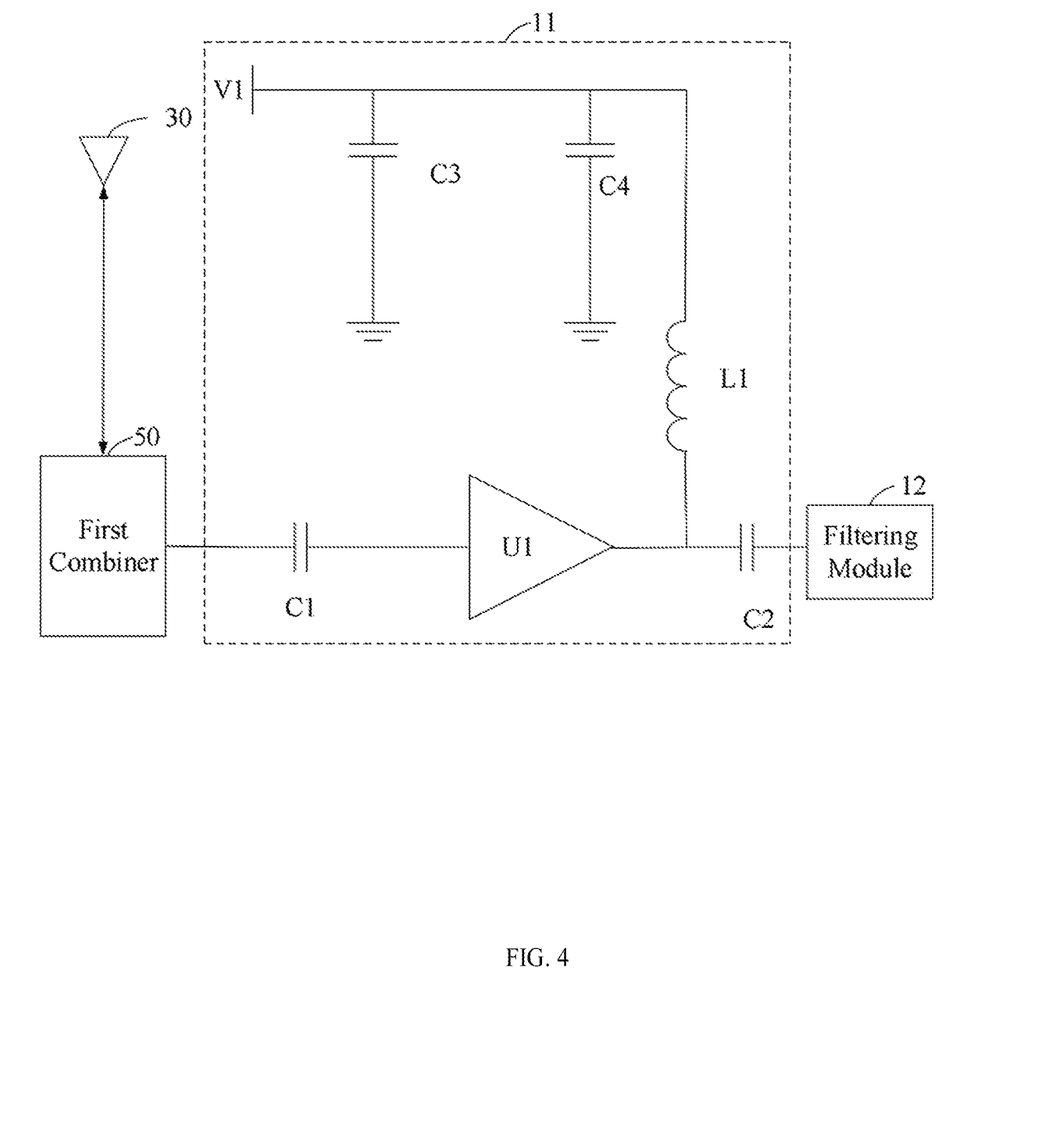
FIG. 4 is a schematic circuit diagram of a low-noise amplification module of the first amplification link of FIG. 2.

Referring to FIG. 4, in one embodiment, the low-noise amplification module 11 includes a low-noise amplifier U1, a capacitor C1, a capacitor C2, a capacitor C3, a capacitor C4, and an inductor L1. The first terminal of the capacitor C1 serves as the input terminal of the low-noise amplification module 11. The second terminal of the capacitor C1 is connected to the input terminal of the low-noise amplifier U1. The output terminal of the low-noise amplifier U1 is connected to the first terminal of the capacitor C2 and the second terminal of the inductor L1. The first terminal of the capacitor C3, the first terminal of the capacitor C4, and the first terminal of the inductor L1 are commonly connected to a first power supply V1. The second terminal of the capacitor C3 is grounded. The second terminal of the capacitor C4 is grounded. The second terminal of the capacitor C2 serves as the output terminal of the low-noise amplification module 11.

In one embodiment, the low-noise amplifier U1 is a model SPF5043Z amplifier. In other embodiments, other models of amplifiers can also be adopted. The first power supply V1 can be a battery.

In one embodiment, the attenuation module 13 includes a digitally controlled attenuator. A signal input terminal of the digitally controlled attenuator serves as the input terminal of the attenuation module, a control terminal of the digitally controlled attenuator serves as the signal adjustment terminal, and a signal output terminal of the digitally controlled attenuator serves as the output terminal of the attenuation module.

In the embodiment, the attenuation module 13 is a digitally controlled attenuator chip with a model number of PE4302. In other embodiments, other types of digitally controlled attenuators may also be used.

Figure 5:
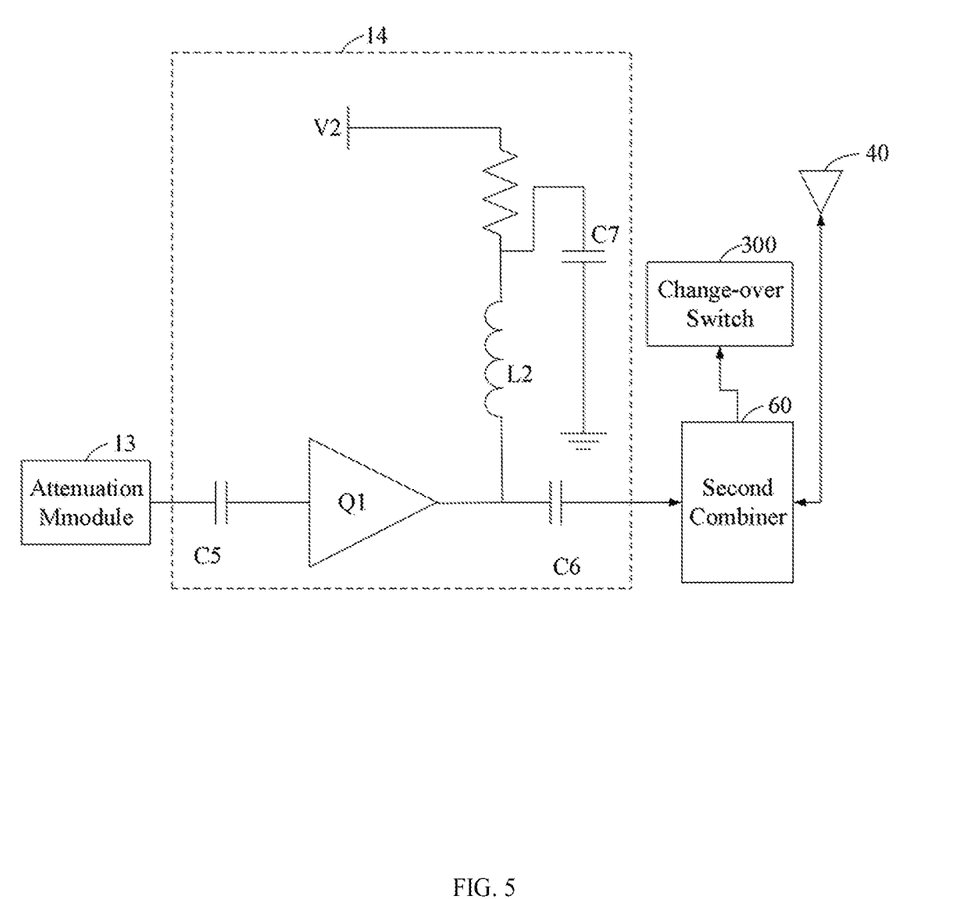
FIG. 5 is a schematic circuit diagram of a power amplification module of the first amplification link of FIG. 2.

Referring to FIG. 5, in one embodiment, the power amplification module 14 includes a power amplifier Q1, a capacitor C5, a capacitor C6, a capacitor C7, an inductor L2, and a resistor R1. The input terminal of the capacitor C5 serves as the input terminal of the power amplification module 14, and the second terminal of the capacitor C5 is connected to the power amplifier Q1. The output terminal of the power amplifier Q1 and the second terminal of the inductor L2 are connected to the first terminal of the capacitor C6. The first terminal of the resistor R1 is connected to the second power supply V2, and the second terminal of the resistor R1 is connected to the first terminal of the capacitor C7 and the first terminal of the inductor L2. The second terminal of the capacitor C7 is grounded. The second terminal of the capacitor C6 serves as the output terminal of the power amplification module 14. The second power source V2 may be a battery.

In one embodiment, the power amplifier Q1 can be a model TQP7M9103 amplifier. In other embodiments, amplifiers of other models can also be adopted.

Figure 6:
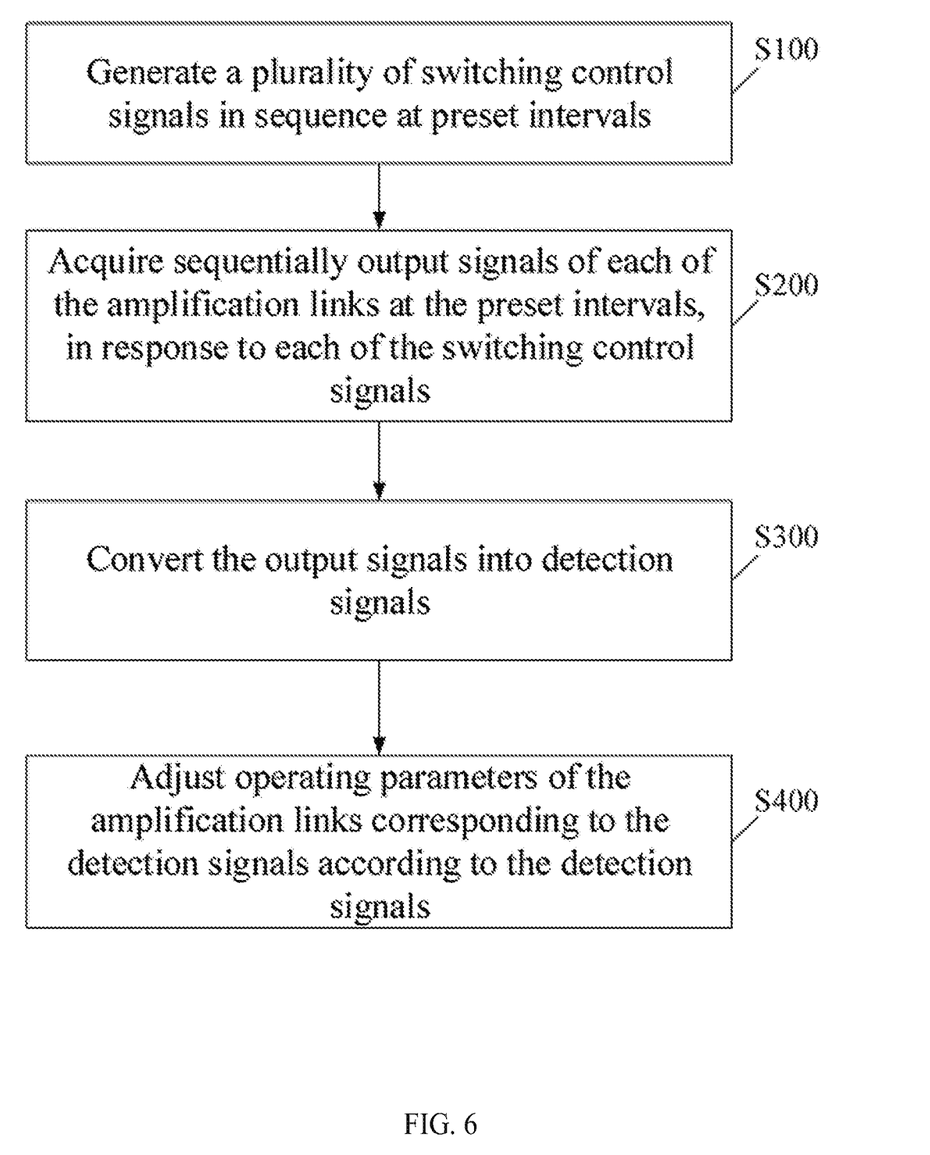
FIG. 6 is a flowchart of a time-sharing detection and control method according to one embodiment.

Referring to FIG. 6, in one embodiment, a time-sharing detection and control method for a wireless transceiver system that includes a plurality of amplification links, includes the following steps. The steps may be implemented by a processor executing computer programs stored in a computer-readable storage. The processor may be a central processing unit (CPU), a general purpose processor, a digital signal processor (DSP), an application specific integrated circuit (ASIC), a field-programmable gate array (FPGA), a programmable logic device, a discrete gate, a transistor logic device, a discrete hardware component, or a combination of some of or all of these components. The general purpose processor may be a microprocessor or any conventional processor or the like.

Step S100: Generate a number of switching control signals in sequence at preset intervals.

Step S200: In response to each of the switching control signals, acquire sequentially output signals of each of the amplification links at the preset intervals.

The output signals of the amplification links can be fed into each branch terminal of a multiplex switch. By turning on or turning off the branch terminals and the common terminal of the multiplexer switch, the output signals of each amplification link can be obtained sequentially. The multiplexer switch may be a multiplexer, a multi-channel analog switch, or a multi-channel radio frequency switch. In an alternative embodiment, a controllable switch can be connected to the output terminal of each amplification link, and the output signals of each amplification link can be obtained by turning on or turning off each controllable switch.

Step S300: Convert the output signals into detection signals.

In the embodiment, the output signals of the amplification links can be converted into detection signals by the detection module 200.

Step S400: Adjust operating parameters of the amplification links corresponding to the detection signals according to the detection signal.

The operating parameters of the amplification links may include the amplification parameters and attenuation parameters. The signal parameters of the detection signals can be compared with a preset threshold value, or the signal parameters of the detection signals can be compared with the signal parameters of standard signals, and it can then determine whether the signal parameters of the detection signals are within a target range according to the comparison result. That is, it can determine whether the signal parameters of the output signals of the amplification links are within the target range, and the operating parameters of the amplification links are adjusted accordingly according to the differences between the signal parameters of the detection signals and a target value.

Figure 7:
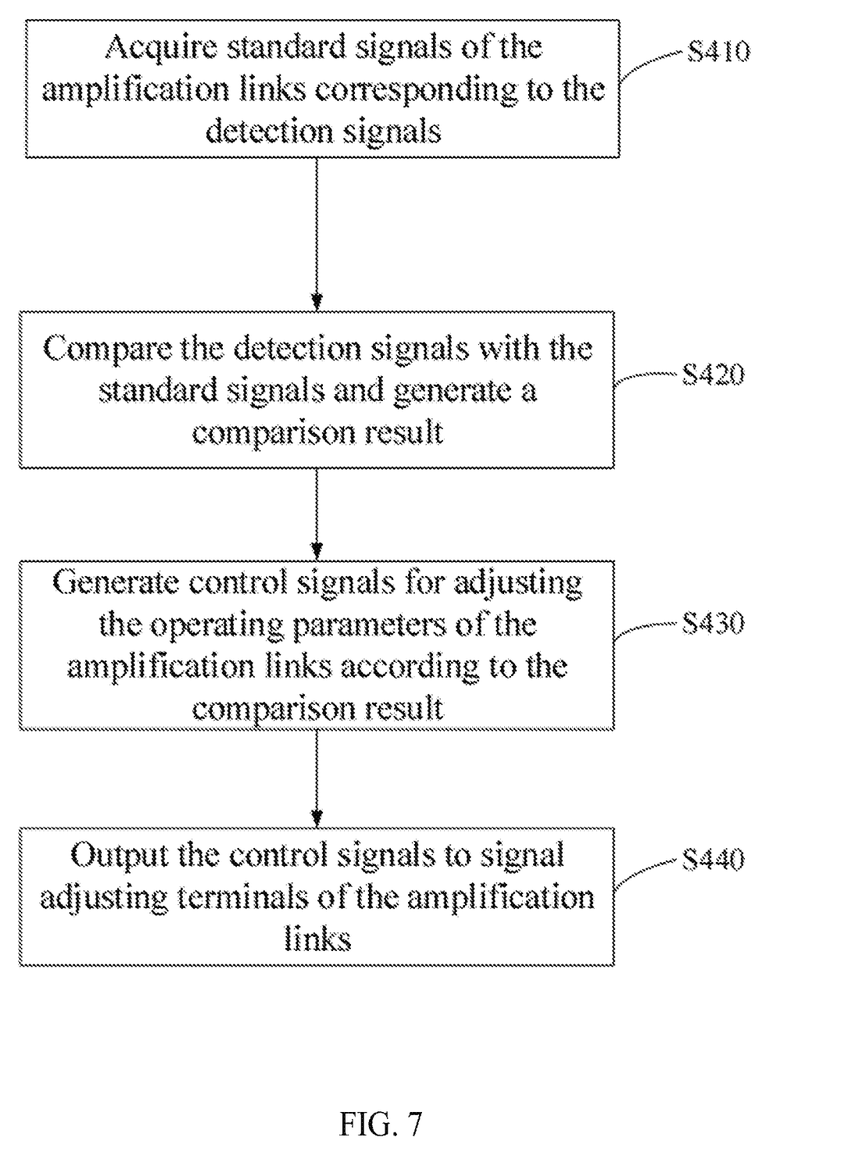
FIG. 7 is a flowchart of a step S400 of the time-sharing detection and control method of FIG. 6.

Referring to FIG. 7, in one embodiment, the step S400 includes the following steps.

Step S410: Acquire standard signals of the amplification links corresponding to the detection signals.

The standard signals can be pre-stored in a database. The standard signals can also be generated according to real-time input or adjusted target value from a user.

Step S420: Compare the detection signals with the standard signals and generate a comparison result.

The signal parameters of the detection signals can be compared with the corresponding signal parameters of the standard signals and the comparison result can then be generated.

Step S430: Generate control signals for adjusting the operating parameters of the amplification links according to the comparison result.

The control signals can be used to simultaneously adjust one or more signal parameters. In one embodiment, the Step S430 includes the following steps.

Generate control signals for controlling the amplification links to increase a current attenuation when a signal strength of the detection signals is greater than a signal strength of standard signals.

Generate control signals for controlling the amplification links to reduce a current attenuation when the signal strength of the detection signals is less than the signal strength of standard signals.

Generate control signals for controlling the amplification links to maintain a current attenuation when the signal strength of the detection signals is less than the signal strength of standard signals.

Step S440: Output the control signals to signal adjusting terminals of the amplification links.

In one embodiment, the time-sharing detection and control method may further include: continuously outputting control signals in a previous interval to the amplification links when a detection module of the wireless transceiver system is not connected to the amplification links.

In the embodiment, the time-sharing detection control method sequentially obtains the output signals of each amplification link at preset intervals, converts the output signals into detection signals, and adjusts the signal parameters of the output signals of the amplification links corresponding to the detection signals according to the detection signals, which realizes the time-sharing detection and control of the wireless transceiver system including multiple amplification links.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A time-sharing detection control circuit connected to a plurality of amplification links, the time-sharing detection control circuit comprising:
    a control module configured to sequentially output a plurality of switching control signals at preset intervals;
    a detection module electrically connected to the control module, the detection module configured to convert output signals from the amplification links into detection signals and output the detection signals to the control module; and
    a change-over switch electrically connected to the control module, the detection module and each of the amplification links, the change-over switch configured to sequentially select one of the amplification links to be connected to the detection module at preset intervals under control of the switching control signals so as to enable the output signals from the one of the amplification links to be inputted into the detection module.

2. The time-sharing detection control circuit of claim 1, wherein each of the amplification links comprises a signal adjusting terminal, the control module is connected to the signal adjusting terminal of each of the amplification links, the control module is configured to compare the detection signals with standard signals after receiving the detection signals, and output operating parameters for adjusting the amplification links according to a comparison result.

3. The time-sharing detection control circuit of claim 2, wherein when a signal strength of the detection signals is greater than a signal strength of the standard signals, the switching control signals are configured to control a corresponding one of the amplification links to increase a current attenuation; when the signal strength of the detection signals is less than the signal strength of the standard signals, the switching control signals are configured to control the corresponding one of the amplification links to reduce the current attenuation; and when the signal strength of the detection signals is greater than the signal strength of the standard signals, the switching control signals are configured to control the corresponding one of the amplification links to maintain the current attenuation.

4. The time-sharing detection control circuit of claim 2, wherein when the detection module is not connected to the amplification links, the control module continuously outputs one of the plurality of switching control signals in a previous interval to the amplification links.

5. The time-sharing detection control circuit of claim 1, wherein the detection module comprises a detection diode or a detection chip.

6. The time-sharing detection control circuit of claim 1, wherein the change-over switch comprises a multi-channel analog switch or a multi-channel radio frequency switch.

7. A wireless transceiver system comprising:
    a plurality of antennas, each of the antennas configured to receive input signals and transmit output signals;
    a plurality of amplification links, each of the amplification links configured to receive one of the input signals through a first of the antennas, amplify the one of the input signals into one of the output signals and output the one of the output signals through a second of the antennas;
    a plurality of combiners, each of the plurality of combiners comprising a common port and a plurality of branch ports, the common ports of the combiners connected to the antennas, respectively, the branch ports of each of the combiners connected to the amplification links, respectively, each of the combiners configured to turn on a signal transmission channel between one of the antennas and one of the amplification links; and
    a time-sharing detection control circuit connected to the plurality of amplification links, the time-sharing detection control circuit comprising:
        a control module configured to sequentially output a plurality of switching control signals at preset intervals;

a detection module connected to the control module, the detection module configured to convert output signals from the amplification links into detection signals and output the detection signals to the control module; and a change-over switch connected to the control module, the detection module and each of the amplification links, the change-over switch configured to sequentially select one of the amplification links to be connected to the detection module at preset intervals under control of the switching control signals so as to enable the output signal from the one of the amplification links to be inputted into the detection module.

8. The wireless transceiver system of claim 7, wherein each of the amplification links comprises:

a low-noise amplification module comprising an input terminal and an output terminal, the input terminal of the low-noise amplification module is connected to a first of the branch ports of one of the combiners, and the low-noise amplification module is configured to receive one of the input signals and amplify the one of the input signals;

a filtering module comprising an input terminal and an output terminal, the input terminal of the filtering module is connected to the output terminal of the low-noise amplification module, the filtering module is configured to filter out clutter interference of signal output by the low-noise amplification module;

an attenuation module comprising an input terminal, an output terminal and a control terminal, the input terminal of the attenuation module is connected to the output terminal of the filtering module, the control terminal of the attenuation module is connected to the control module and serves as a signal adjusting terminal of one of the amplification links, and the attenuation module is configured to adjust a signal strength of signal output by the filtering module; and a power amplification module comprising an input terminal and an output terminal, the input terminal of the power amplification module is connected to the output terminal of the attenuation module, and the output terminal of the power amplifier module is connected to the change-over switch of the time-sharing detection control circuit and a second of the branch ports of the one of the combiners, the power amplification module is configured to amplify signal output by the attenuation module, and output an amplified signal as one of the output signals.

9. The wireless transceiver system of claim 8, wherein the low-noise amplification module comprising: a low-noise amplifier, a first capacitor, a second capacitor, a third capacitor, a fourth capacitor, and a first inductor, a first terminal of the first capacitor serves as the input terminal of the low-noise amplification module, a second terminal of the first capacitor is connected to an input terminal of the low-noise amplifier, an output terminal of the low-noise amplifier is connected to a first terminal of the second capacitor and a second terminal of the first inductor, a first terminal of the third capacitor, a first terminal of the fourth capacitor, and a first terminal of the first inductor are commonly connected to a first power source, a second terminal of the third capacitor is grounded, a second terminal of the fourth capacitor is grounded, and the second terminal of the second capacitor serves as the output terminal of the low-noise amplification module.

10. The wireless transceiver system of claim 8, wherein the attenuation module comprises a digitally controlled attenuator, a signal input terminal of the digitally controlled attenuator serves as the input terminal of the attenuation module, a control terminal of the digitally controlled attenuator serves as the signal adjustment terminal, and a signal output terminal of the digitally controlled attenuator serves as the output terminal of the attenuation module.

11. The wireless transceiver system of claim 8, wherein the power amplification module comprises: a power amplifier, a fifth capacitor, a sixth capacitor, a seventh capacitor, a second inductor, and a first resistor, an input terminal of the fifth capacitor serves as the input terminal of the power amplification module, a second terminal of the fifth capacitor is connected to an input terminal of the power amplifier, and an output terminal of the power amplifier is connected to a second terminal of the second inductor and a first terminal of the sixth capacitor, a first terminal of the first resistor is connected to a second power source, a second terminal of the first resistor is connected to a first terminal of the seventh capacitor and a first terminal of the second inductor, a second terminal of the seventh capacitor is grounded, and a second terminal of the sixth capacitor serves as the output terminal of the power amplification module.

12. A time-sharing detection control circuit connected to a plurality of amplification links, the time-sharing detection control circuit comprising:

a control module configured to sequentially output a plurality of switching control signals at preset intervals;

a plurality of detection modules, the detection module configured to convert output signals from the amplification links into detection signals; and a change-over switch electrically connected to the control module and the detection modules, the change-over switch configured to sequentially select one of the detection modules to be connected to the change-over switch at preset intervals under control of the switching control signals so as to enable the output signals from the one of the amplification links to be inputted into the detection module.

* * * * *